(12) United States Patent
Liang

(10) Patent No.: US 11,766,889 B2
(45) Date of Patent: Sep. 26, 2023

(54) FULL-BODY MARBLE-PATTERNED GLASS MOSAIC AND PREPARATION METHOD THEREOF

(71) Applicant: FOSHAN PAMASE BUILDING MATERIAL CO., LTD., Guangdong (CN)

(72) Inventor: Tian Liang, Guangdong (CN)

(73) Assignee: FOSHAN PAMASE BUILDING MATERIAL CO., LTD., Foshan (CN)

( * ) Notice: Subject to any disclaimer, the term of this patent is extended or adjusted under 35 U.S.C. 154(b) by 875 days.

(21) Appl. No.: 16/587,073

(22) Filed: Sep. 30, 2019

(65) Prior Publication Data

US 2020/0139750 A1    May 7, 2020

(30) Foreign Application Priority Data

Nov. 2, 2018    (CN) .......................... 201811300419.3

(51) Int. Cl.
| | | |
|---|---|---|
| *C03C 1/06* | (2006.01) | |
| *C03C 8/02* | (2006.01) | |
| *C03C 8/14* | (2006.01) | |
| *B32B 18/00* | (2006.01) | |
| *C03B 19/06* | (2006.01) | |
| *C03B 19/09* | (2006.01) | |

(Continued)

(52) U.S. Cl.
CPC .............. *B44C 3/123* (2013.01); *B32B 18/00* (2013.01); *C03B 19/06* (2013.01); *C03B 19/09* (2013.01); *C03C 1/06* (2013.01); *C03C 8/02* (2013.01); *C03C 8/14* (2013.01); *C03C 4/02* (2013.01)

(58) Field of Classification Search
None
See application file for complete search history.

(56) References Cited

U.S. PATENT DOCUMENTS 7,416,690 B2 *    8/2008    Haun ...................... C04B 33/36
264/109

FOREIGN PATENT DOCUMENTS

| CN | 103951169 A | * | 7/2014 |
|---|---|---|---|
| CN | 107827355 A | | 3/2018 |

(Continued)

OTHER PUBLICATIONS

CN-108658456-A Clarivate Analytics Machine Translation Performed May 17, 2023. (Year: 2023).*

(Continued)

*Primary Examiner* — Lisa L Herring

(57) ABSTRACT

The present invention discloses a method for preparing a full-body marble-patterned glass mosaic, comprising mixing a glass powder with an additive to obtain a mixture; adding water to the mixture and mixing thoroughly; granulating and sieving to obtain base clay body powder; mixing a colorant and a flux according to a specific ratio to obtain a colorant mixture in powder form; distributing the base clay body powder and the colorant mixture into multiple layers via a mold; press-molding to obtain a clay body; firing the clay body to obtain the full-body marble-patterned glass mosaic. Accordingly, the present invention provides a full-body marble-patterned glass mosaic prepared by the method described above. The glass mosaic of the present invention has a strong layering texture and a well-defined structure, and it faithfully resembles the pattern and texture of natural marble.

8 Claims, 10 Drawing Sheets

(51) Int. Cl.
   *C03C 4/02*     (2006.01)
   *B44C 3/12*     (2006.01)

(56) References Cited

FOREIGN PATENT DOCUMENTS

CN       107935395 A   *   4/2018  ......... C03C 17/3411
CN       108658456 A   *   10/2018

OTHER PUBLICATIONS

CN-107935395-A Clarivate Analytics Machine Translation Performed May 17, 2023. (Year: 2023).*
CN-103951169-A Clarivate Analytics Machine Translation Performed May 17, 2023. (Year: 2023).*

* cited by examiner

FULL-BODY MARBLE-PATTERNED GLASS MOSAIC AND PREPARATION METHOD THEREOF

CROSS REFERENCE TO RELATED APPLICATIONS

The present application claims the benefit of Chinese Patent Application No. 201811300419.3 filed on Nov. 2, 2018, the contents of which are incorporated herein by reference in their entirety.

FIELD OF THE INVENTION

The present invention relates to a decorative material, in particular to a full-body marble-patterned glass mosaic and a preparation method thereof.

BACKGROUND OF THE INVENTION

Glass mosaics are also known as glass mosaic tiles. It is a small, colored surface decorative glass. Made from natural minerals and glass powder, glass mosaics are among the safest construction materials and are an exceptionally environmentally friendly material. They are acid and alkali resistant, corrosion-resistant, and their colors do not fade. Thus, it is very suitable to use glass mosaics as construction materials for bathroom walls and floor. Glass mosaics generally appear colorless and transparent, colored and transparent, or translucent.

In order to allow glass mosaics to have a variety of different colors and increase the diversity of glass mosaics, in existing techniques, a low-temperature glaze is sprayed onto the surface of a clay body of mosaic glass, followed by low-temperature firing. To achieve a marble-like pattern on the glass mosaic, in existing techniques, inkjet printing is performed on the surface of the clay body of the mosaic glass which is covered with the low-temperature glaze.

Chinese patent publication No. CN107827355A has disclosed a process for preparing a clay body of mosaic glass, comprising the following steps: (1) mixing 80-95 mass % of raw glass powder and 5-20 mass % of waste glass powder to obtain a mixture. (2) Adding water to the mixture obtained in step (1) and performing ball milling to obtain a slurry; granulating and sieving to obtain mixed clay body powder. (3) putting the mixed clay body powder into a mold, performing press forming; after firing at a low temperature, the clay body of mosaic glass is obtained. The method also includes spraying a low-temperature glaze on the surface of the clay body of mosaic glass and then firing at low temperature. Inkjet printing is performed on the surface of the mosaic glass body which is covered with the low-temperature glaze to form a pattern.

The method described above merely involves printing different patterns on the surface of a glass clay body, followed by firing at a high temperature. The patterns obtained only floats on the surface of the glass mosaic, and do not have a three-dimensional quality. In addition, these patterns do not faithfully resemble natural stones, and may easily fade due to wear.

SUMMARY OF THE INVENTION

The objective of the present invention is to provide a full-body marble-patterned glass mosaic which has a strong layered texture and a well-defined structure, and faithfully resembles the pattern and texture of natural marble.

Another objective of the present invention is to provide a method for preparing a full-body marble-patterned glass mosaic, the method is simple, easy to operate, straightforward in its implementation, and low in cost.

To achieve the objective above, the present invention provides a method for preparing a full-body marble-patterned glass mosaic, comprising:

mixing a glass powder with an additive to obtain a mixture;

adding water to the mixture and mixing thoroughly; granulating and sieving to obtain base clay body powder;

mixing a colorant and a flux according to a specific ratio to obtain a colorant mixture in powder form;

distributing the base clay body powder and the colorant mixture into multiple layers via a mold; press-molding to obtain a clay body;

firing the clay body to obtain the full-body marble-patterned glass mosaic.

As an improvement to the technical solution above, the mold comprises a flower mesh for printing a pattern on a horizontal surface and a cover mesh for printing a pattern on a vertical surface; the flower mesh is arranged inside the cover mesh;

the base clay body powder and the colorant mixture form a clay layer having an individual pattern through one or more of the flower mesh; the clay layers sequentially layer on top of one another, forming a marble pattern covering all surfaces through the cover mesh.

As an improvement to the technical solution above, a process of forming each clay layer includes:

distributing the base clay body powder into one or more flower meshes to form a bottom layer;

distributing the colorant mixture into the bottom layer according to a pattern;

distributing the base clay body powder into the bottom layer.

As an improvement to the technical solution above, the height of the mold is 10-100 mm, the flower mesh is a silk screen printing mesh.

As an improvement to the technical solution above, a mixing ratio of the base clay body powder to the colorant mixture is 100:(0.1-30).

As an improvement to the technical solution above, the flux is a low-temperature flux and has a melting temperature of 600-700° C.;

the colorant is a high-temperature colorant and has a melting temperature of 1000-1300° C.;

a mixing ratio of the flux to the colorant is 100:(1-30).

As an improvement to the technical solution above, the low-temperature flux is a transparent flux.

As an improvement to the technical solution above, the additive includes a binder, a whitening agent, and an anti-settling agent, the binder is added in an amount of 0.1 to 1 wt % of the glass powder, and the binder is any one or more of methyl cellulose and polyvinyl alcohol;

the whitening agent is added in an amount of 1 to 10 wt % of the glass powder, and the whitening agent is titanium dioxide;

the anti-settling agent is added in an amount of 0.1 to 1 wt % of the glass powder.

As an improvement to the technical solution above, the glass powder is prepared by mixing and ball milling scraps of a glass mosaic and cullet, and has a particle size of 20-120 mesh;

the colorant mixture is prepared by mixing and ball milling a colorant and a flux, and has a particle size of 20-120 mesh.

Accordingly, the present invention provides a full-body marble-patterned glass mosaic prepared by the method described above.

The present invention has the following beneficial effects:

The invention provides a method for preparing a full-body marble-patterned glass mosaic, which comprises distributing base clay body powder and a colorant mixture to multiple layers through a mold, and performing press forming to obtain a clay body. Instead of the prior art method in which the color and pattern are formed by adding a glaze, the present invention adds a powdered colorant mixture instead. As the colorant mixture is mixed in the base clay body powder, when pressed, the colorant mixture is pressed together with the base clay body powder according to a pre-determined pattern. In this way, the colorant mixture penetrates from the upper surface through to the lower surface of the base clay body powder. In contrary to the method of the prior art, which involves mono-layer distribution followed by inkjet printing on the surface, the method of the present invention involves a multi-layered distribution process. As a result, the glass mosaic has a strong layering texture and a well-defined structure, and it faithfully resembles the pattern and texture of natural marble; even after the surface is worn, the colorant and the pattern remain.

The mold comprises a flower mesh for printing a pattern on a horizontal surface pattern and a cover mesh for printing a pattern on a vertical surface. In the present invention, during the distribution, a plurality of flower meshes are sequentially layered on top of one another; then, the cover mesh allows the pattern to be separated to individual layers to obtain a pattern having different shades at the inside of the glass mosaic. As a result, the front and side surfaces of the glass mosaic of the present invention faithfully resemble the pattern and texture of natural marble. When the glass mosaic of the present invention is attached to a horizontal surface, the sides exposed also have a marble pattern that is visually appealing and refined.

In the present invention, the main raw material is the waste glass powder; no raw glass powder is required. This allows 100% waste recycling and greatly reduces production cost.

The full-body marble-patterned glass mosaic of the present invention serves as a substitute for natural marble and contributes to the protection of natural resources.

DETAILED DESCRIPTION OF THE ILLUSTRATED EMBODIMENTS

Figure 1:
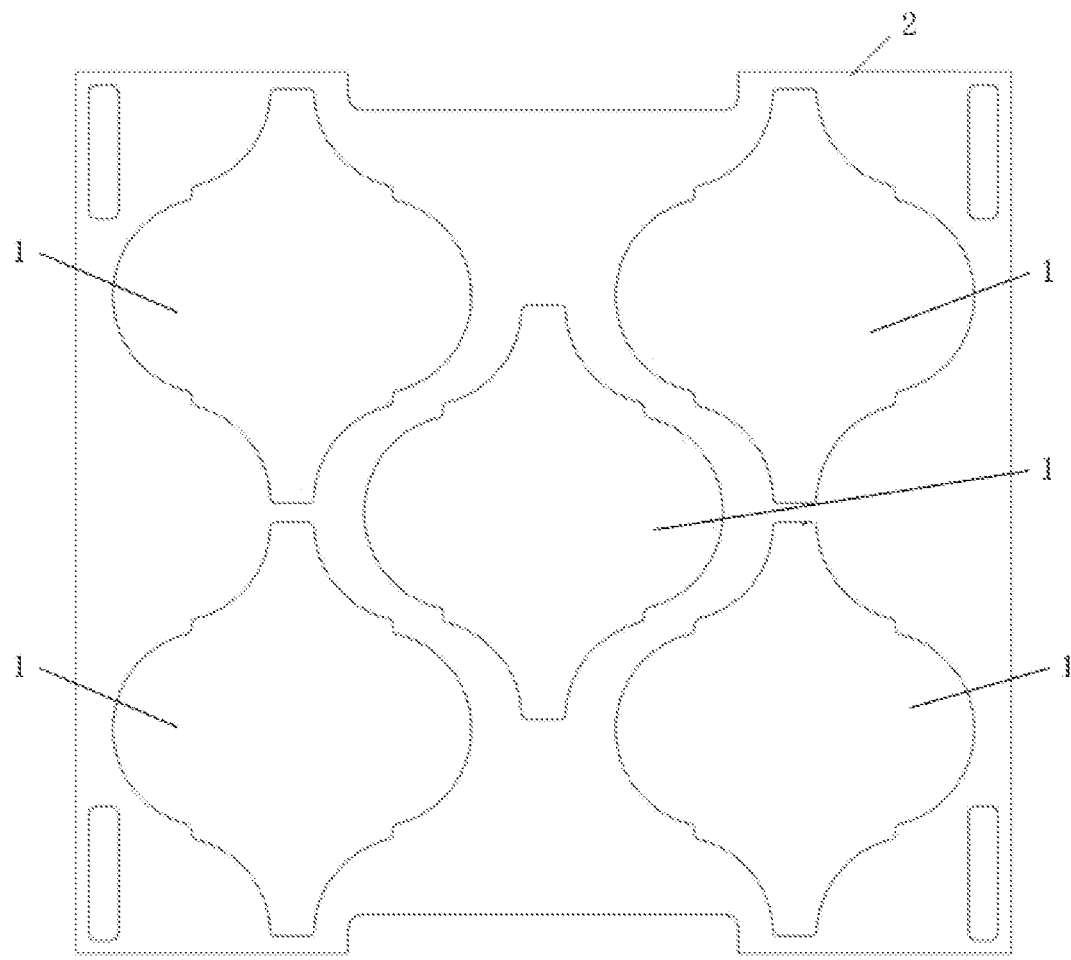
FIG. 1 is a structural diagram of an example of a mold of the present invention.

In order to clearly illustrate the objectives, technical solutions and advantageous effects of the present invention, the present invention will be further described in detail with reference to the accompanying drawings.

The invention provides a preparation method for a full-body marble-patterned glass mosaic, comprising the following steps:

S101: mixing a glass powder with an additive to obtain a mixture.

The glass powder is prepared by mixing and ball milling the scraps of a glass mosaic and cullet, and has a particle size of 20-120 mesh.

In the prior art, raw glass powder and waste glass powder are mixed in a certain ratio to prepare a glass mosaic. As the melting temperature of the waste glass powder increases with the increased number of firings it undergoes, it may be in a semi-molten state during the low-temperature firing of the glass mosaic. Thus, it is necessary to mix the waste glass powder with raw glass powder: during the firing process, the molten part of the waste glass powder can be sufficiently fused with the raw glass powder and the surface of the glass clay body to form a stable glaze layer, as the melting temperature of the raw glass powder is lower than that of the waste glass powder.

In the present invention, the main raw material is the waste glass powder; no raw glass powder is required. This allows 100% waste recycling and greatly reduces production cost. In the present invention, only a binder added in an amount of 0.1-1 wt % of the waste glass powder is required. The binder binds the waste glass powder together to form the product. Preferably, the binder is any one or a combination of methyl cellulose and polyvinyl alcohol, but is not limited thereto. The additive of the present invention is used in a small amount but plays an important role in the preparation of the product.

It should be noted that the waste glass powder is any one or more of soda-lime-silica glass, quartz glass, high-silica glass, lead silicate glass, aluminosilicate glass, and borosilicate glass.

In order to increase the whiteness of the glass mosaic and to truly recreate the pattern and texture of natural marble, the additive further includes a whitening agent added in an amount of 1 to 10 wt % of the glass powder. Preferably, the whitening agent is titanium dioxide, but is not limited thereto. In other embodiments of the present application, the whitening agent may also be benzoyl peroxide, an iron removal agent, or the like.

By adding a certain amount of titanium dioxide as the whitening agent into the colorant, the invention not only further increases the whiteness of the glass mosaic, but also allows a more natural transition from the molten part to the non-molten part as a result of the melting reaction between titanium dioxide and the molten part of the waste glass powder; the melting reaction also serves to bind base clay body powder together. After firing, the overall color of the glass mosaic is more vivid and uniform, which contributes to the overall color stability of the glass mosaic. As a result, the glass mosaic has a better texture, gives a smoother touch, and is more visually appealing.

The additive further includes an anti-settling agent added in an amount of 0.1 to 1 wt % of the glass powder. The anti-settling agent allows the mixing of the waste glass powder to be more uniform and stable.

S102: adding water to the mixture and mixing thoroughly; granulating and sieving to obtain base clay body powder.

The base clay body powder can be prepared according to an existing method; the present invention does not specifically limit its preparation method.

S103, mixing a colorant and a flux according to a specific ratio to obtain a colorant mixture in powder form;

The colorant mixture in powder form is the raw material for a marble pattern. Preferably, the colorant mixture is prepared by mixing a colorant and a flux, followed by ball milling. It has a particle size of 20-120 mesh.

In order to ensure that the present invention truly resembles the pattern and texture of natural marble, and since the colorant needs to be fired subsequently, the colorant employed by the present invention has a high melting temperature of 1000-1300° C., and the flux has a low melting temperature of 600-700° C. The mixing ratio of the flux to the colorant is 100:(1-30).

Preferably, the colorant of the present invention has a melting temperature of 1200° C. The flux has a melting temperature of 650-700° C. The mixing ratio of the flux to the colorant is 100:(1-15).

More preferably, the flux is a transparent frit. The transparent frit is a glass, which is composed of certain raw materials and is produced by high-temperature melting followed by rapid cooling. It is insoluble and stable.

The chemical composition of the transparent frit is as follows: 40 wt %-50 wt % $SiO_2$, 10 wt %-15 wt % $Al_2O_3$, 0.1 wt %-1 wt % $Fe_2O_3$, 10 wt %-15 wt % CaO, 5 wt %-12 wt % MgO, 1 wt %-3 wt % $K_2O+Na_2O$, 0.01 wt %-0.5 wt % $TiO_2$, <0.01 wt % SrO, 0.1 wt %-1 wt % $Li_2O$, <0.01 wt % PbO, <0.01 wt % ZnO, 3 wt %-10 wt % $B_2O_3$, 0.1 wt %-2 wt % $P_2O_5$, 2 wt %-6 wt % F. A transparent frit of this chemical composition is able to effectively improve the layering texture of the marble pattern, and to obtain a pattern that is decorative and refined.

To further improve the layering texture of the glass mosaic and to allow the glass mosaic to have a more well-defined structure in order to more faithfully resemble the pattern and texture of natural marble, the mixing ratio of the base clay body powder to the colorant mixture is 100:(0.1-30). As the colorant mixture is the raw material for the marble pattern, its amount plays an important role in the creation of the marble pattern. When the amount of the colorant mixture is less than 0.1 wt %, the marble pattern is not clear and its layering texture is unsatisfactory; when the amount of the colorant mixture is greater than 30 wt %, the marble pattern is unnatural and its layering texture is unsatisfactory.

It should be noted that the sequence of step S103 may be interchanged with steps S101 and S102, or these steps could proceed simultaneously.

S104: Distributing the base clay body powder and the colorant mixture into multiple layers via a mold; press-molding to obtain a clay body.

Figure 2:
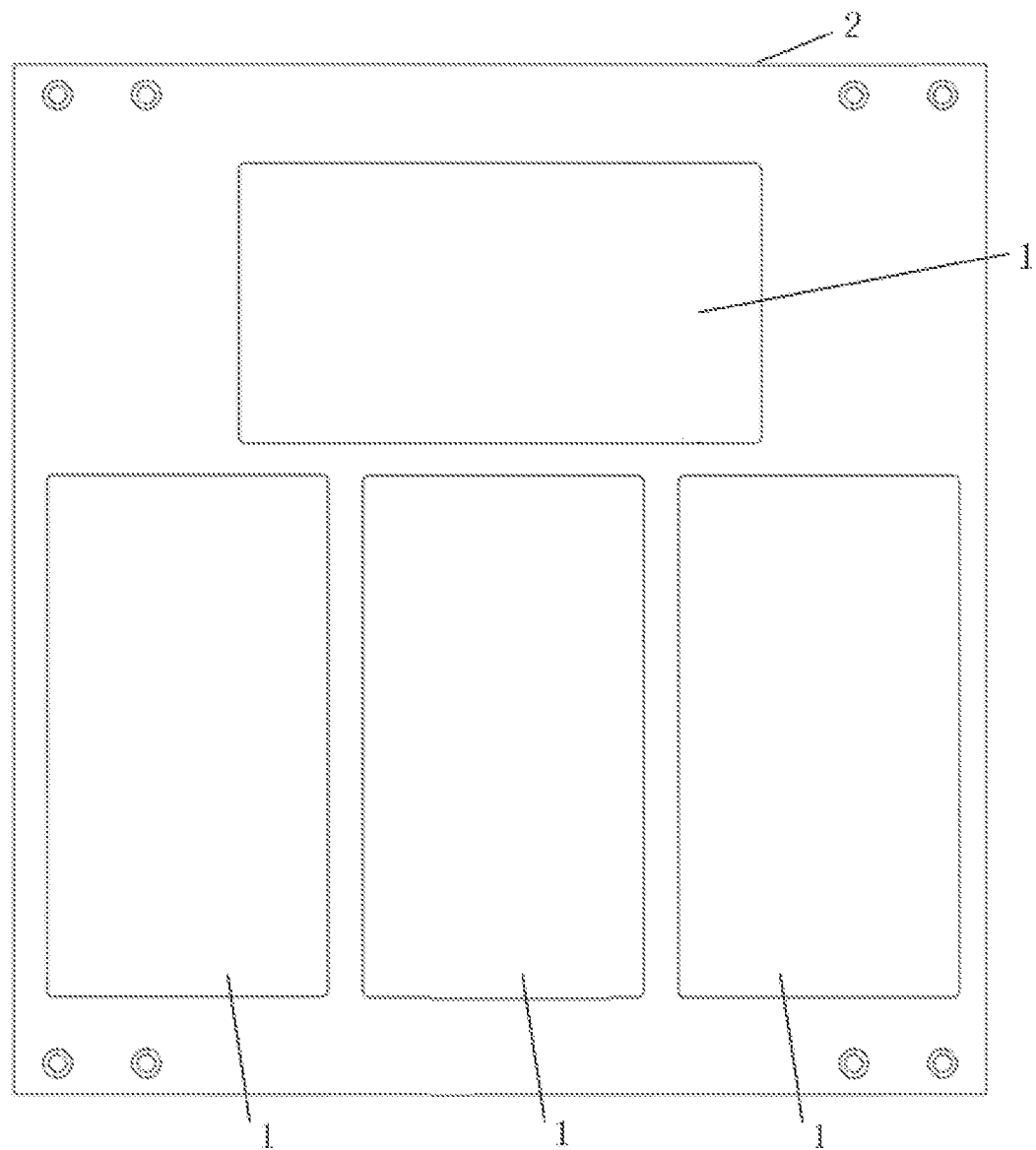
FIG. 2 is a structural diagram of another example of a mold of the present invention.

Referring to FIGS. 1 and 2, the mold comprises a flower mesh 1 for printing a pattern on a horizontal surface and a cover mesh 2 for printing a pattern on a vertical surface; the flower mesh 1 is arranged inside the cover mesh 2. The base clay body powder and the colorant mixture form a clay layer having an individual pattern through one or more of the flower mesh 1. The clay layers sequentially layer on top of one another, ultimately forming a marble pattern covering all surfaces through the cover mesh 2. Preferably, the base clay body powder and the colorant mixture are distributed into 2-10 layers via a mold to obtain a marble pattern with a strong layered texture under energy-saving conditions.

Specifically, the process of forming each clay layer includes the following:

distributing the base clay body powder into one or more flower meshes 1 to form a bottom layer;

distributing the colorant mixture into the bottom layer according to a pattern;

distributing the base clay body powder into the bottom layer.

In the formation of each clay layer, it is preferable to provide a plurality of flower meshes having a variety of shapes and arrangements; their specific shapes and arrangements can be designed according to the desired pattern. Specifically, the shapes of these flower meshes may be square, circular, rectangular, diamond, gourd, triangle, etc., and are not limited thereto. The flower meshes may be arranged in a linear manner, a centrally distributed manner, an arc-shaped manner, etc., and is not limited thereto. As shown in FIG. 1, the flower meshes of FIG. 1 are gourd-shaped and are arranged in a centrally distributed manner. As shown in FIG. 2, the flower meshes are square-shaped and are arranged in a linear manner.

The cover mesh allows the base clay body powder and the colorant mixture to form into a clay body along the vertical direction.

In order to facilitate multi-layered distribution, the colorant mixture and the base clay body powder are thoroughly mixed and pressed; the height of the mold is 10-100 mm, the height of the clay body of the present application is preferably 11-50 mm. The height of the clay body can be specifically designed according to the requirements of the customer.

The flower mesh is a silk screen printing mesh. The present invention innovatively uses a silk screen printing mesh to form a pattern on the glass mosaic with the base clay body powder and the colorant mixture powder. Using the method of the present invention, good printing precision, strong layering texture, and a well-defined structure can be achieved, which are not possible with the inkjet printers of the prior art.

It should be noted that the term "silk screen printing mesh" is a general term referring to the meshes involved in silk screen printing. In the present invention, the flower mesh may be a metal mesh or a chemical fiber mesh. The metal mesh is generally made of stainless steel, which has high tension and low elongation. The chemical fiber mesh is generally made from polyester or nylon. A polyester silk screen printing mesh has low elongation, is less likely to deform, and allows high-precision printing. On the other hand, as nylon is elastic, a nylon mesh can be employed for printing on a non-planar surface; furthermore, nylon is wear-resistant. Preferably, the flower mesh of the present invention is a chemical fiber net.

Since the colorant mixture is mixed with the base clay body powder, when pressed, the colorant mixture is pressed together with the base clay body powder following a predetermined pattern; eventually, the colorant mixture penetrates from the upper surface through to the lower surface of the base clay body powder. In contrary to the method of the prior art, which involves mono-layer distribution followed by inkjet printing on the surface, the method of the present invention involves a multi-layered distribution process. As a result, the glass mosaic has a strong layering texture and a well-defined structure, and it faithfully resembles the pattern and texture of natural marble; even after the surface is worn, the colorant and the pattern remain.

The mold comprises a flower mesh for printing a pattern on a horizontal surface pattern and a cover mesh for printing a pattern on a vertical surface. In the distribution of the base clay body powder and the colorant mixture of the present invention, a plurality of flower meshes are sequentially layered on top of one another; then, the cover mesh allows the pattern to be separated to individual layers to obtain a pattern having different shades at the inside of the glass mosaic. As a result, the front and the side surfaces of the glass mosaic of the present invention faithfully resemble the pattern and texture of natural marble. When the glass mosaic of the present invention is attached to a horizontal surface, the sides exposed also have a marble pattern that is visually appealing and refined.

In addition, the full-body marble-patterned glass mosaic of the present invention serves as a substitute for natural marble and contribute to the protection of natural resources. The present invention is particularly important today as natural minerals and stones are becoming increasingly depleted.

S105: Firing the clay body to obtain the full-body marble-patterned glass mosaic product.

Specifically, the clay body is placed on a high-temperature resistant sheet, cleaned, and then fired in a kiln. The firing temperature is preferably 800-850° C., the firing time is preferably 40-100 min. More preferably, the firing temperature is 820-850° C. and the firing time is 40-80 min.

Firing is a key step in the present invention. The firing must be performed in a temperature range of 760–800° C. A firing temperature that is too low is not conducive to increasing the strength of the mosaic, and the mosaic obtained this way may not have desirable shrinkage and water absorption. If the firing temperature is too high, the shrinkage of the product would be too large, and the strength of the product may be unsatisfactory.

It should be noted that it is also necessary to cool the glass mosaic preliminary product obtained after firing. The cooling treatment is a fast cooling treatment; specifically, the glass mosaic preliminary product can be cooled by a fast-cooling fan.

As a more preferred embodiment of the present invention, after S105, the method further includes the following step:

S106: Performing surface treatment on the glass mosaic product.

Specifically, the surface of the glass mosaic product is polished to obtain a smooth surface; a clear marble-patterned glass mosaic is thus obtained.

Finally, it should be noted that since the present invention is formed by molding, it is not necessary to perform the cutting required by the prior art.

Accordingly, the present invention also provides a full-body marble-patterned glass mosaic obtained by the preparation method described above. The full-body marble-patterned glass mosaic can be used as a decorative material. The decorative material may be a decorative brick with full-body marble-patterned glass mosaics attached to its surface or a decorative panel with full-body marble-patterned glass mosaics attached to its surface.

The invention is further illustrated by the following embodiments.

Embodiment 1

(1) Components:

The base clay body powder comprises 100 parts of glass powder, 0.1 parts of a binder, and 5 parts of water, wherein the binder is methyl cellulose.

The colorant mixture comprises 0.02 parts of a colorant and 1 part of a flux, the flux is a transparent frit.

(2) Preparation Method

1. Producing glass powder: mixing and ball milling the scraps of a glass mosaic and cullet to obtain glass powder with a particle size of 20-120 mesh.

2. Mixing the glass powder with the binder in a specific ratio to obtain a mixture.

3. Adding water to the mixture and mixing thoroughly, followed by granulating and sieving to obtain a base clay body powder.

4. Mixing the colorant and the flux according to a specific ratio to obtain a colorant mixture in powder form with a particle size of 20-120 mesh.

Figure 3:
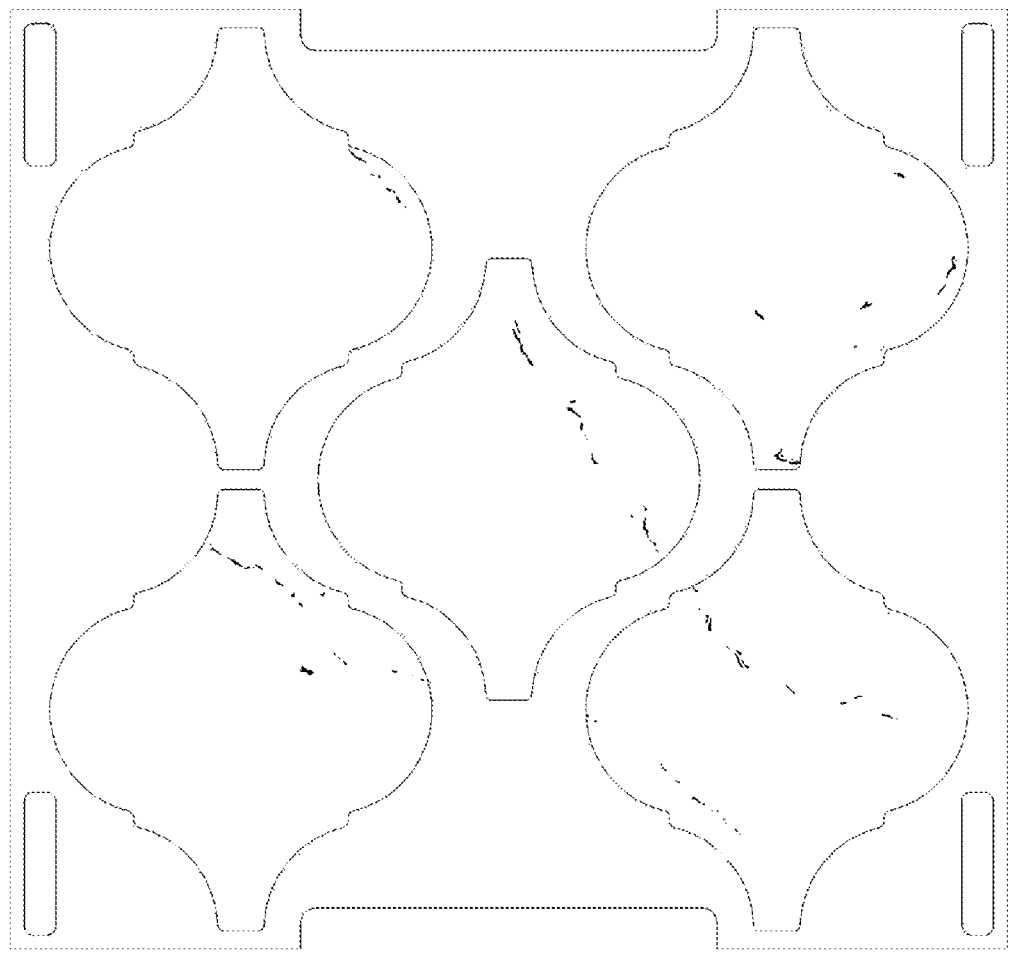
FIG. 3 is a schematic diagram showing the distribution of the base clay body powder and the colorant mixture in the mold according to embodiment 1 of the present invention.

5. Distributing the base clay body powder and the colorant mixture into five layers via the mold shown in FIG. 1; press-molding to obtain a clay body as shown in FIG. 3.

6. Firing the clay body to obtain a full-body marble-patterned glass mosaic preliminary product; the firing temperature is 820° C. and the firing time is 50 min.

Figure 4:
FIG. 4 is a front view of a full-body marble-patterned glass mosaic product produced according to embodiment 1 of the present invention.
Figure 5:
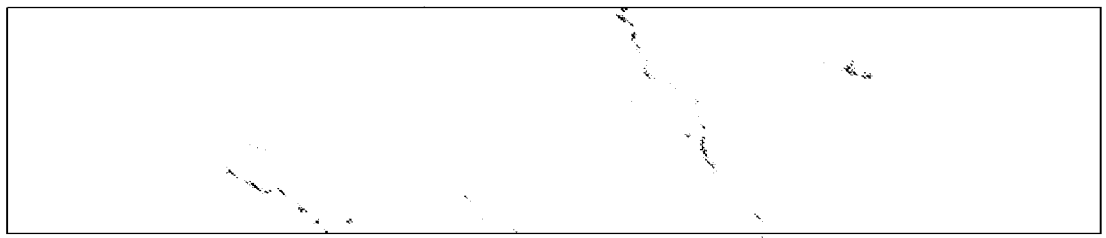
FIG. 5 is a side view of the full-body marble-patterned glass mosaic product produced according to embodiment 1 of the present invention.

7. Polishing the surface of the glass mosaic preliminary product to obtain the final product, as shown in FIGS. 4 and 5.

Embodiment 2

(1) Components:

The base clay body powder comprises 100 parts of glass powder, 0.5 parts of a binder, 2 parts of a whitening agent, and 5 parts of water, wherein the binder is polyvinyl alcohol; the whitening agent is titanium dioxide.

The colorant mixture comprises 0.1 parts of a colorant and 1 part of a flux, the flux is a transparent frit.

(2) Preparation Method

1. Producing glass powder: mixing and ball milling the scraps of a glass mosaic and cullet to obtain glass powder with a particle size of 20-120 mesh.

2. Mixing the glass powder with the binder and the whitening agent in a specific ratio to obtain a mixture.

3. Adding water to the mixture and mixing thoroughly, followed by granulating and sieving to obtain a base clay body powder.

4. Mixing the colorant and the flux according to a specific ratio to obtain a colorant mixture in powder form with a particle size of 20-120 mesh.

Figure 6:
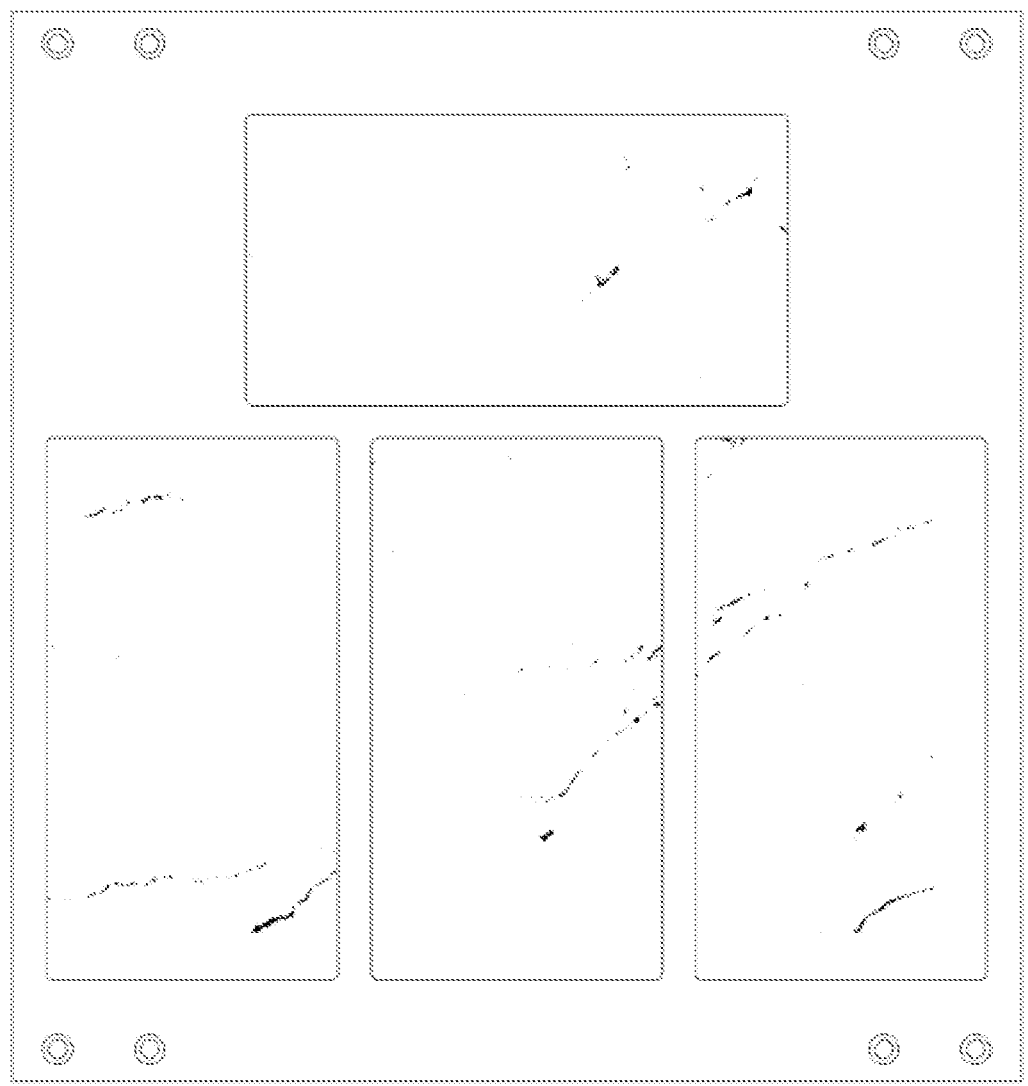
FIG. 6 is a schematic diagram showing the distribution of the base clay body powder and the colorant mixture in the mold according to embodiment 2 of the present invention.

5. Distributing the base clay body powder and the colorant mixture into six layers via the mold shown in FIG. 2; press-molding to obtain a clay body as shown in FIG. 6.

6. Firing the clay body to obtain a full-body marble-patterned glass mosaic preliminary product; the firing temperature is 830° C. and the firing time is 60 min.

Figure 7:
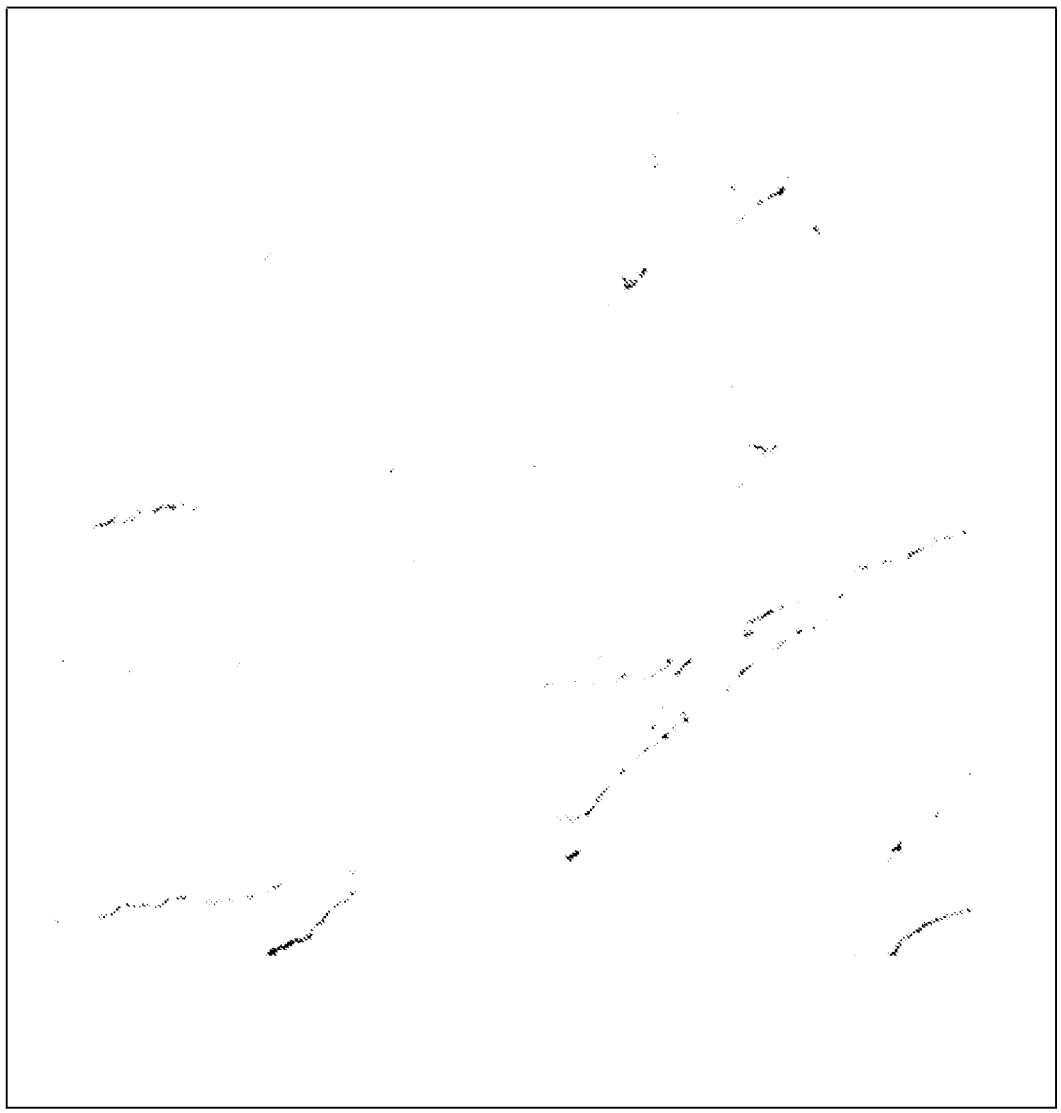
FIG. 7 is a front view of a full-body marble-patterned glass mosaic product produced according to embodiment 2 of the present invention.
Figure 8:
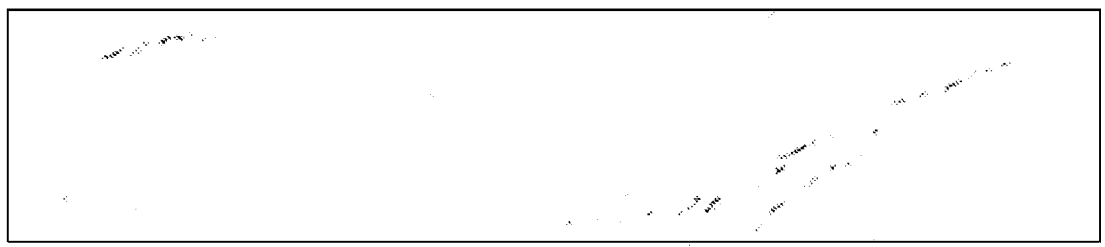
FIG. 8 is a side view of the full-body marble-patterned glass mosaic product produced according to embodiment 2 of the present invention.

7. Polishing the surface of the glass mosaic preliminary product to obtain the final product, as shown in FIGS. 7 and 8.

Embodiment 3

(1) Components:

The base clay body powder comprises 100 parts of glass powder, 0.6 parts of a binder, 0.2 parts of an anti-settling agent, 4 parts of a whitening agent, and 5 parts of water, wherein the binder is methyl cellulose; the whitening agent is titanium dioxide.

The colorant mixture comprises 0.4 parts of a colorant and 20 parts of a flux, the flux is a transparent frit.

(2) Preparation Method

1. Producing glass powder: mixing and ball milling the scraps of a glass mosaic and cullet to obtain glass powder with a particle size of 20-120 mesh.

2. Mixing the glass powder with the binder, the anti-settling agent, and the whitening agent in a specific ratio to obtain a mixture.

3. Adding water to the mixture and mixing thoroughly, followed by granulating and sieving to obtain a base clay body powder.

4. Mixing the colorant and the flux according to a specific ratio to obtain a colorant mixture in powder form with a particle size of 20-120 mesh.

Figure 9:
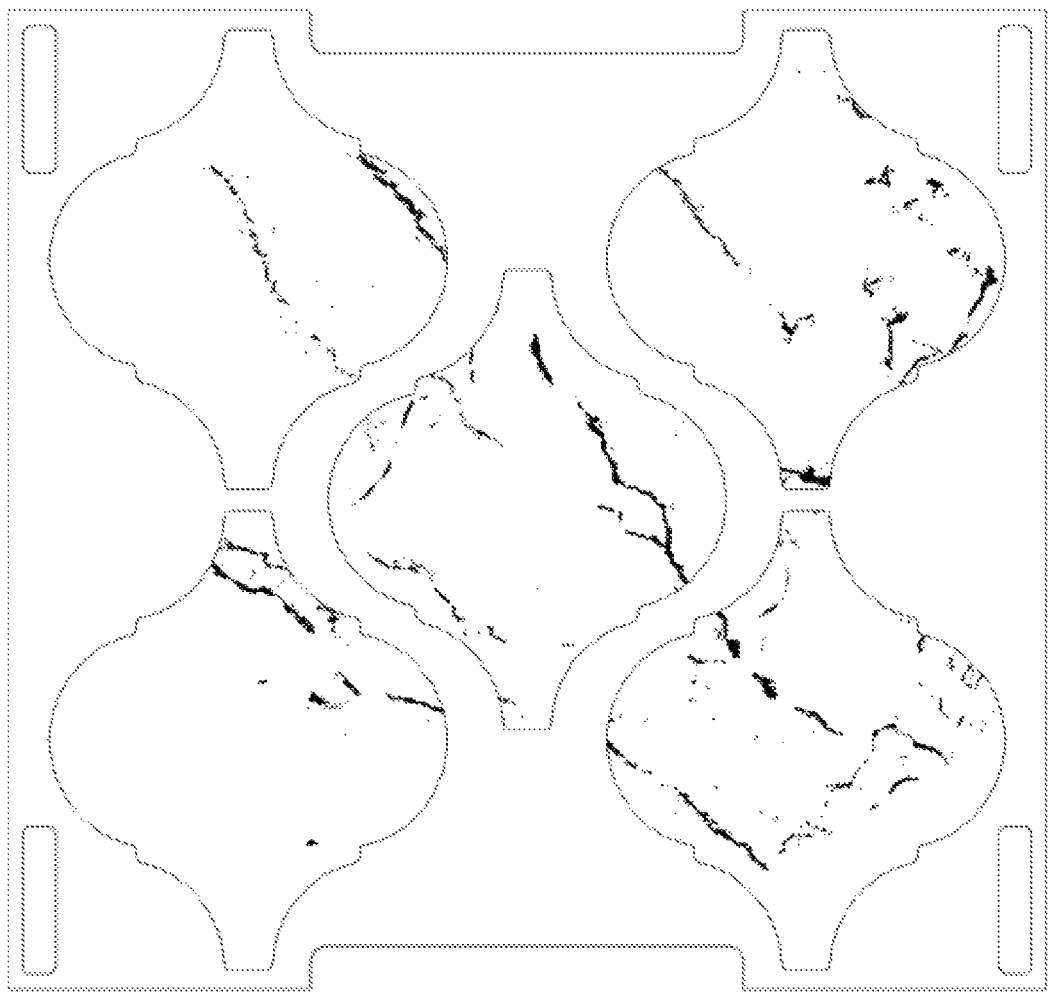
FIG. 9 is a schematic diagram showing the distribution of the base clay body powder and the colorant mixture in the mold according to embodiment 3 of the present invention.

5. Distributing the base clay body powder and the colorant mixture into four layers via the mold shown in FIG. 1; press-molding to obtain a clay body as shown in FIG. 9.

6. Firing the clay body to obtain a full-body marble-patterned glass mosaic preliminary product; the firing temperature is 840° C. and the firing time is 65 min.

Figure 10:
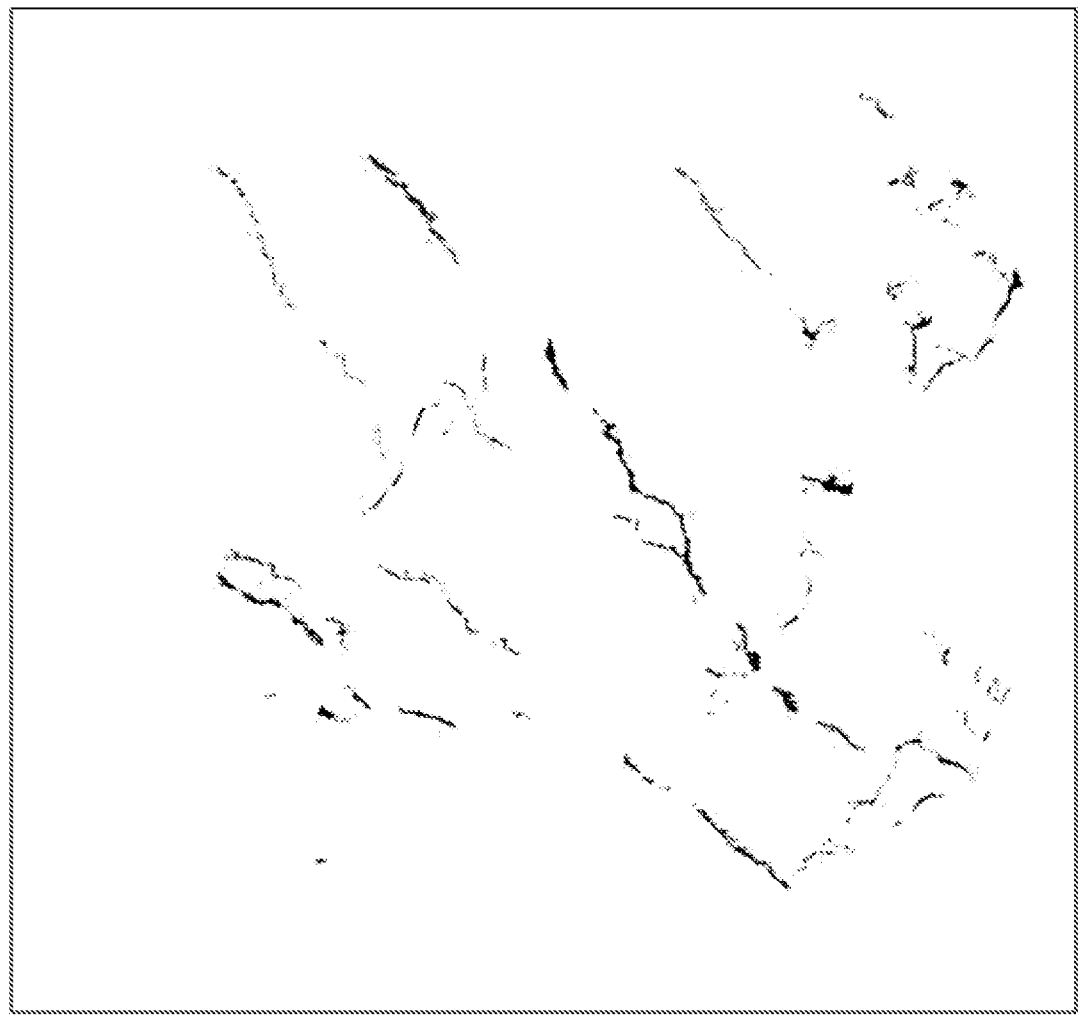
FIG. 10 is a front view of a full-body marble-patterned glass mosaic product produced according to embodiment 3 of the present invention.
Figure 11:
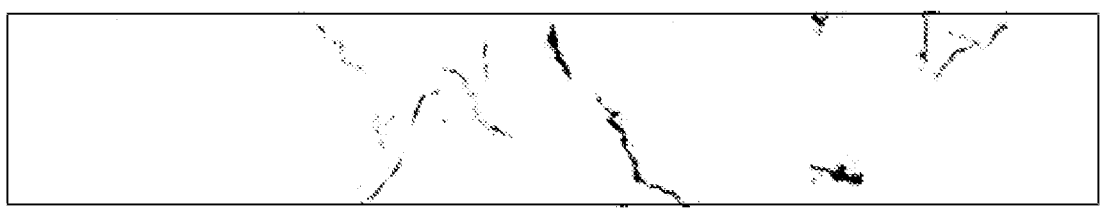
FIG. 11 is a side view of the full-body marble-patterned glass mosaic product produced according to embodiment 3 of the present invention.

7. Polishing the surface of the glass mosaic preliminary product to obtain the final product, as shown in FIGS. 10 and 11.

Embodiment 4

(1) Components:

The base clay body powder comprises 100 parts of glass powder, 0.9 parts of a binder, 0.1 parts of an anti-settling agent, 6 parts of a whitening agent, and 5 parts of water, wherein the binder is polyvinyl alcohol, the whitening agent is titanium dioxide.

The colorant mixture comprises 0.3 parts of a colorant and 30 parts of a flux, the flux is a transparent frit.

(2) Preparation Method

1. Producing glass powder: mixing and ball milling the scraps of a glass mosaic and cullet to obtain glass powder with a particle size of 20-120 mesh.

2. Mixing the glass powder with the binder, the anti-settling agent, and the whitening agent in a specific ratio to obtain a mixture.

3. Adding water to the mixture and mixing thoroughly, followed by granulating and sieving to obtain a base clay body powder.

4. Mixing the colorant and the flux according to a specific ratio to obtain a colorant mixture in powder form with a particle size of 20-120 mesh.

Figure 12:
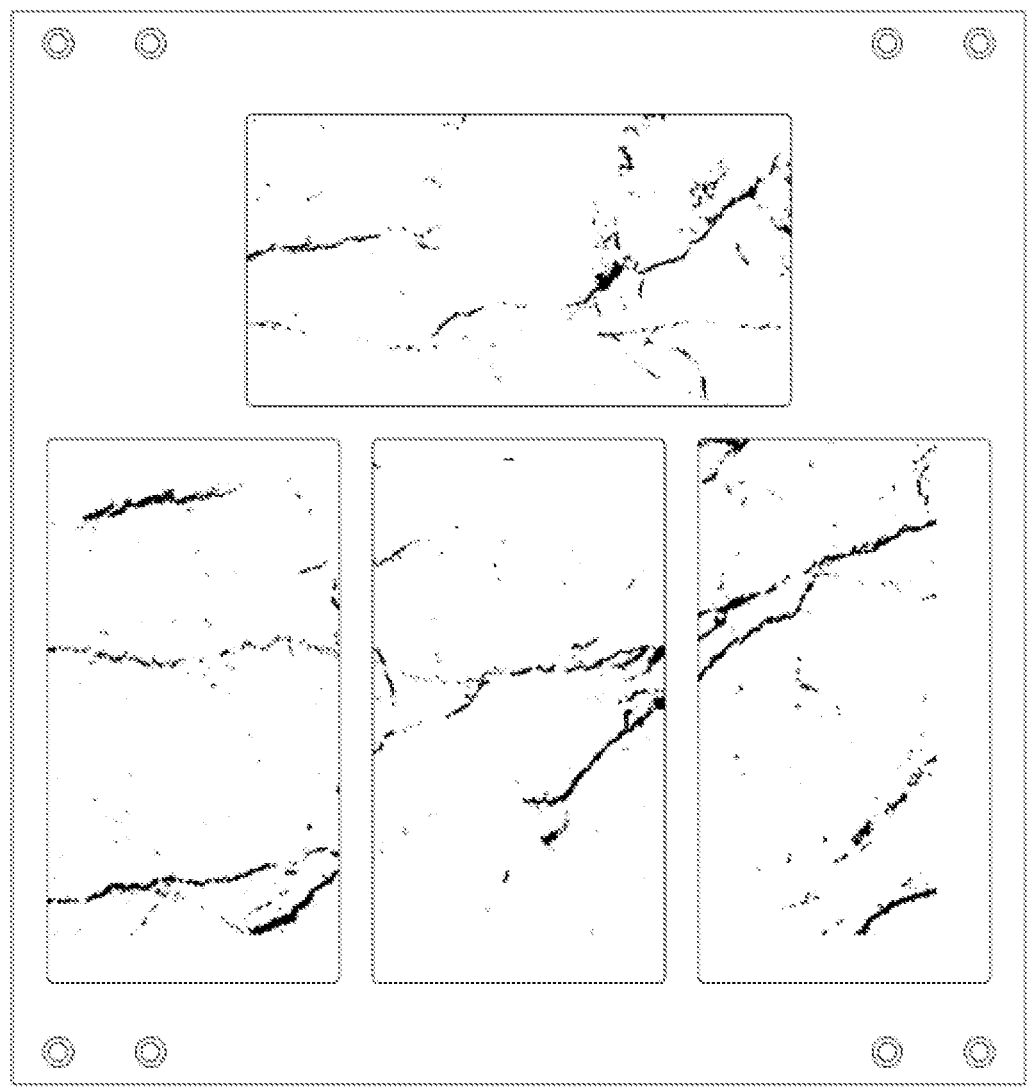
FIG. 12 is a schematic diagram showing the distribution of the base clay body powder and the colorant mixture in the mold according to embodiment 4 of the present invention.

5. Distributing the base clay body powder and the colorant mixture into eight layers via the mold shown in FIG. 2; press-molding to obtain a clay body as shown in FIG. 12.

6. Firing the clay body to obtain a full-body marble-patterned glass mosaic preliminary product; the firing temperature is 850° C. and the firing time is 70 min.

Figure 13:
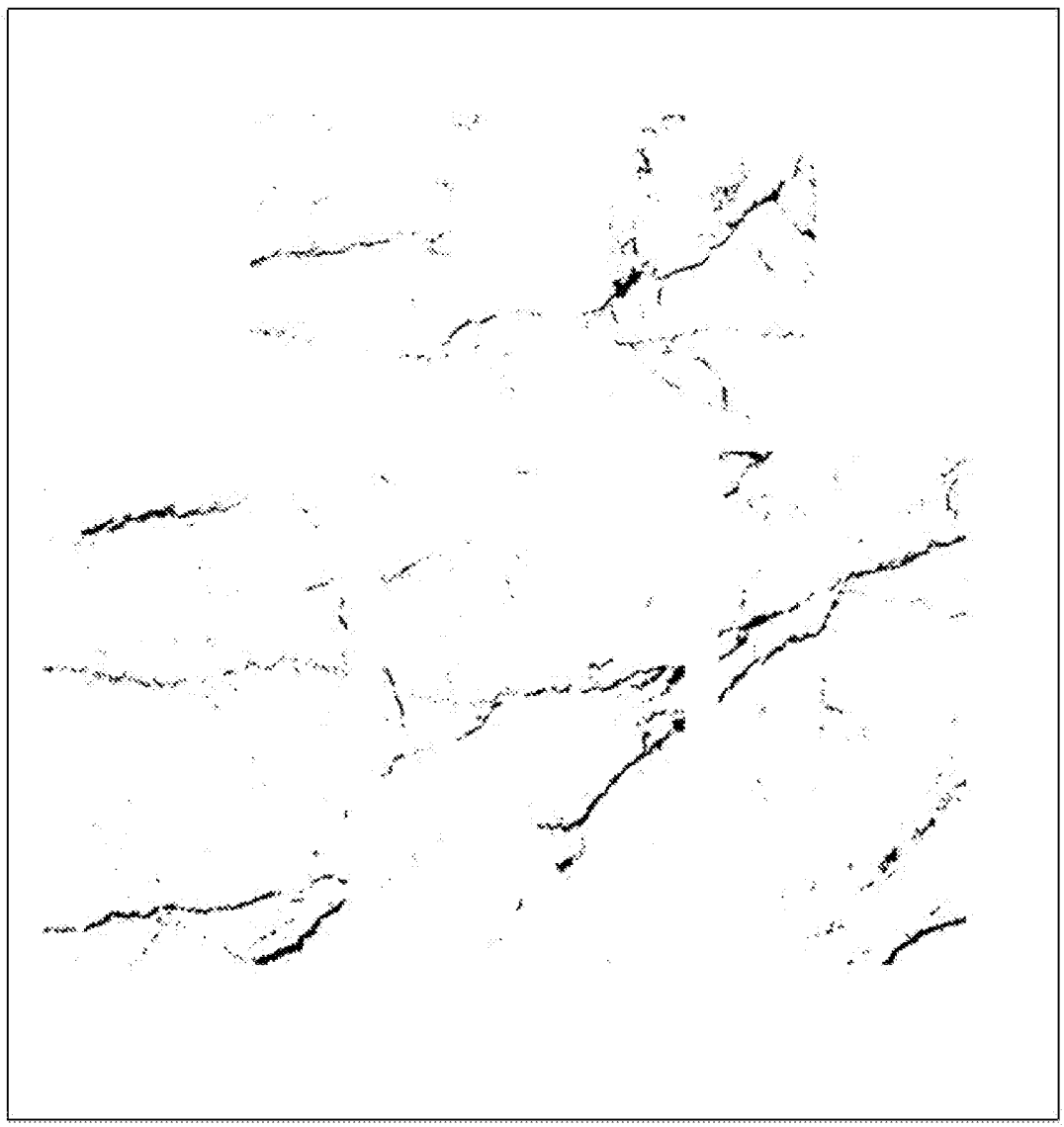
FIG. 13 is a front view of a full-body marble-patterned glass mosaic product produced according to embodiment 4 of the present invention.
Figure 14:
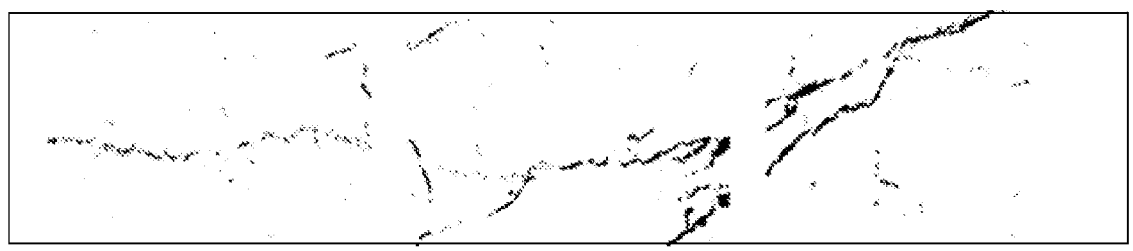
FIG. 14 is a side view of the full-body marble-patterned glass mosaic product produced according to embodiment 4 of the present invention.

7. Polishing the surface of the glass mosaic preliminary product to obtain the final product, as shown in FIGS. 13 and 14.

From the figures showing the final products obtained by embodiments 1-4 (FIGS. 3-14), it can be concluded that the front and side surfaces of the glass mosaics of the present invention truly resembles the pattern and texture of natural marble.

Then, the glass mosaics obtained by embodiments 1-4 of the present invention were tested, the results are as follows:

|  | Embodiment 1 | Embodiment 2 | Embodiment 3 | Embodiment 4 |
| --- | --- | --- | --- | --- |
| Shrinkage | 7.9% | 8.1% | 8.3% | 8.0% |
| Water absorption | 0.08% | 0.07% | 0.09% | 0.08% |
| Flexural strength | 46 MPa | 48 MPa | 47 MPa | 45 MPa |

In summary, the glass mosaic of the present invention has a natural marble pattern, and its front and side surfaces truly resemble the pattern and texture of natural marble. The present invention allows glass mosaics to have a variety of different patterns; the glass mosaics are visually appealing and refined. Moreover, the glass mosaic also has excellent properties: its shrinkage is less than 8.5%, water absorption is less than 0.1%, and flexural strength is larger than 45 MPa.

The above are only the preferred embodiments of the present invention, and the scope of the present invention is not limited thereto. Equivalent changes made according to the claims of the present invention are still within the scope of the present invention.

What is claimed is:

1. A method for preparing a full-body marble-patterned glass mosaic, comprising the following:

mixing a glass powder with an additive to obtain a mixture, wherein the additive comprises a whitening agent added in an amount of 1 to 10 wt % of the glass powder, and the whitening agent is titanium dioxide;

adding water to the mixture and mixing thoroughly, and granulating and sieving to obtain base clay body powder;

mixing a colorant and a flux according to a specific ratio to obtain a colorant mixture in powder form, wherein the flux is a low-temperature flux and has a melting temperature of 600-700° C., the colorant is a high-temperature colorant and has a melting temperature of 1000-1300° C., a mixing ratio of the flux to the colorant ranges from 100:1 to 100:30;

distributing the base clay body powder and the colorant mixture into multiple clay layers via a mold, and press-molding to obtain a clay body; and firing the clay body to obtain the full-body marble-patterned glass mosaic.

2. The method for preparing the full-body marble-patterned glass mosaic according to claim 1, wherein the mold comprises a flower mesh for printing a pattern on a horizontal surface and a cover mesh for printing a pattern on a vertical surface; the flower mesh is arranged inside the cover mesh;

the base clay body powder and the colorant mixture form a clay layer having an individual pattern through one or more of the flower mesh; and clay layers sequentially layer on top of one another, forming a marble pattern covering all surfaces through the cover mesh.

3. The method for preparing the full-body marble-patterned glass mosaic according to claim 2, wherein a process of forming each clay layer includes:

distributing the base clay body powder into one or more flower meshes to form a bottom layer;

distributing the colorant mixture into the bottom layer according to a pattern; and distributing the base clay body powder into the bottom layer.

4. The method for preparing the full-body marble-patterned glass mosaic according to claim 2, wherein the mold has a height of 10-100 mm, and the flower mesh is a silk screen printing mesh.

5. The method for preparing the full-body marble-patterned glass mosaic according to claim 2, wherein a mixing ratio of the base clay body powder to the colorant mixture ranges from 100:1 to 100:30.

6. The method for preparing the full-body marble-patterned glass mosaic according to claim 1, wherein the low-temperature flux is a transparent flux.

7. The method for preparing the full-body marble-patterned glass mosaic according to claim 1, wherein the additive includes a binder and an anti-settling agent, the binder is added in an amount of 0.1 to 1 wt % of the glass powder, and the binder is any one or more of methyl cellulose and polyvinyl alcohol; and the anti-settling agent is added in an amount of 0.1 to 1 wt % of the glass powder.

8. The method for preparing the full-body marble-patterned glass mosaic according to claim 1, wherein the glass powder is prepared by mixing and ball milling scraps of a glass mosaic and cullet, and has a particle size of 20-120 mesh; and the colorant mixture is prepared by mixing and ball milling the colorant and the flux, and has a particle size of 20-120 mesh.

\* \* \* \* \*